United States Patent

[11] 3,572,773

| [72] | Inventor | William B. Read |
| | | Sylvania, Ohio |
| [21] | Appl. No. | 579,753 |
| [22] | Filed | Sept. 15, 1966 |
| [45] | Patented | Mar. 30, 1971 |
| [73] | Assignee | Owens-Illinois, Inc. |

[54] GLASS PIPE JOINT
11 Claims, 3 Drawing Figs.

[52] U.S. Cl. ..................................... 285/236,
285/423
[51] Int. Cl. ..................................... F16l 9/10,
F16l 21/00
[50] Field of Search .......................... 285/(Glass
Digest), 236, 235, 233, 234, 423, 229, 373, 236

[56] References Cited
UNITED STATES PATENTS
| 3,376,055 | 4/1968 | Donroe | 285/423X |
| 3,394,952 | 7/1968 | Garrett | 285/236 |
| 3,439,945 | 4/1969 | Chambers | 285/373 |
| 1,062,155 | 5/1913 | Harris | 285/253X |
| 1,829,236 | 10/1931 | Perkins | 285/236X |
| 3,211,475 | 10/1965 | Freed et al | 285/236X |
| 3,232,647 | 2/1966 | Kirchoff | 285/(Glass) |
| 3,233,907 | 2/1966 | Stanton | 285/(Glass) |
| 3,249,685 | 5/1966 | Heflin | 285/236X |

*Primary Examiner*—Thomas F. Callaghan
*Attorneys*—David R. Birchall and W. A. Schaich ABSTRACT: A pipe coupling adapted for coupling the ends of two axially aligned glass pipes. The coupling embodies a tubular sealing gasket positioned over the exterior end portions of the pipes, an elastomeric sleeve placed exteriorly over the gasket to contact the gasket and the pipes, and a metallic constricting band positioned around the sleeve. The band clamps the sleeve and the gasket tightly to the end portions of the aligned pipes.

PATENTED MAR 30 1971  3,572,773

INVENTOR.
WILLIAM B. READ
BY D.R. Birchall
W.A. Schaich
ATTORNEYS

3,572,773

GLASS PIPE JOINT

This invention relates to an improvement in pipe couplings and more particularly the invention relates to an improvement wherein two axially aligned sections of glass pipe are structurally joined together by means of a pipe coupling.

Glass pipes are used extensively in the chemical industry where it is desirable to convey corrosive fluids that would normally erode away a similar pipe constructed of metal. While glass pipe provides an effective means of handling highly reactive fluids, it is well known that the coupling of such pipes one to the other is more complicated that the coupling together of similar all-metal pipes. In making glass pipe joints, the coupling must grasp the end of the pipe firmly enough to prevent leaks from occurring yet the coupling must not exceed the working stresses of the glass material which it surrounds. Also, the coupling must not scratch or mar the glass surface since such stress concentrations cannot be tolerated in structural glass materials.

One of the inherent weaknesses of the prior art glass pipe couplings was the fact that under constant pressure from within, the fluids transported by the glass pipe system would work their way through the components of the coupling and thus present a corrosive problem or extremely dangerous fire hazard.

Another disadvantage of prior art couplings resided in the difficulty encountered in reassembling the pipe joint after one section of the glass pipe had been removed for some reason or other. During reassembly, the end of the pipe would not slide into its sealing position because of interference caused by some portion of the closure that had shifted into the space originally occupied by the glass pipe. In order to correct the situation, the entire joint and coupling would have to be disassembled, thus requiring more time and greatly increasing the possibility of inadvertently breaking the glass pipe system.

The present invention solves some of the aforementioned drawbacks associated with the prior art pipe couplings by producing a pipe joint that will withstand internal pressures without leaks occurring. Then too, the pipe joint can be disassembled and reassembled without disengagement or dislocation of the coupling parts which prevents reinsertion of one or both of the glass pipe ends into their original position within the coupling.

The present invention consists of two axially aligned glass pipes with two of the ends thereof in abutting but not contacting relationship. A Teflon, or similar material, sealing gasket is formed into a generally cylindrical configuration and positioned over the exterior surfaces and between the ends of the glass pipes. An elastomeric sleeve is positioned exteriorly of the sealing gasket so that it not only contacts the sealing gasket but also is in contact with the exterior of the glass tube. A metallic constricting band is placed radially outward from the elastomeric sleeve and is tightened to effect a seal.

The primary object of the present invention is to produce a pipe coupling that will provide an effective fluid seal while structurally uniting two lengths of glass pipe.

Another object of the present invention is to provide a pipe coupling that will unite a glass pipe with a plain end to another glass pipe with a plain end.

A further object of this invention is to provided pipe coupling that will unite together a glass pipe with a plain end to another glass pipe with a flanged end.

An additional object of the present invention is to provide a pipe coupling that will be highly resistant to pipe blowouts caused by internal pressures.

Another object of the instant invention is to provide a pipe coupling into which the ends of the pipe can be inserted without being obstructed by portions of the coupling.

The present invention consists of a sealing gasket of generally cylindrical configuration into which the ends of the pipe fit. An indented or centrally located ring of lesser diameter than the external diameter of the glass pipe is incorporated as an integral part of the sealing gasket so that the ends of the glass pipe will abut thereagainst in sealing engagement. Additional sealing rings are positioned in concentric relationship on both sides of the minimum diameter portion of the sealing gasket for additional sealing against the exterior surfaces of the glass pipes. Positioned radially outward from the sealing gasket there is an elastomeric compression sleeve that completely envelops the external surface of the sealing gasket. The elastomeric compression sleeve is retained by a clamp ring for compressing the elastomeric sleeve radially inward. As the elastomeric sleeve is compressed radially inward it in turn forces the sealing gasket into tight engagement with the external surfaces of the glass pipes. In the drawings:

Figure 1:
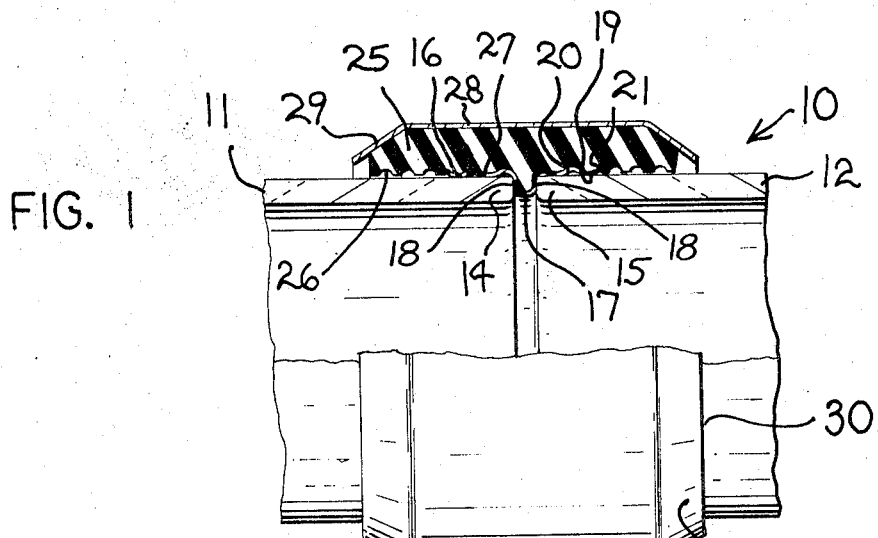
FIG. 1 shows a side view of a pipe coupling partly broken away and shown in section.

Referring to FIG. 1 of the drawings, the overall pipe coupling is represented by the numeral 10. A glass pipe 11 and a axially aligned pipe 12 are shown with their respective plain ends 14 and 15 in spaced apart relationship. A sealing gasket 16 is positioned over the exterior portions of ends 14 and 15 of glass pipes 11 and 12. Sealing gasket 16 is preferably made from a material such as Teflon. Toward the center of sealing gasket 16 is a radially inwardly extending ring 17. Ring 17 can be cylindrical across its inwardmost extent or it can be rounded. Ring 17 has outwardly extending flanges 18 that unite the radially inward portion of ring 17 with the remainder of the sealing gasket 16. When viewed in the cross section of FIG. 1, that portion of sealing gasket 16 laying immediately adjacent the external surface of glass pipes 11 and 12 is of undulating or sinusoidal configuration. When the entire configuration of sealing gasket 16 is considered, it will be immediately apparent that the radially inward sections of sealing gasket 16 will contact the exterior of glass pipes 11 and 12, as at 19. The peaks or radially outward sections 20 of sealing gasket 16 are not necessarily in contact with the exterior surface of the glass pipes. The end 21 of sealing gasket 16 is located radially away from the exterior of the glass pipes thus facilitating the entry of glass pipes 11 and 12 into the coupling.

Positioned exteriorly of sealing gasket 16 is elastomeric compression sleeve 25. Sleeve 25 may be made from any relatively resilient material such as for example rubber. The radially inward surface of sleeve 25 has an overall cylindrical configuration, however reference to FIG. 1 will show that arcuate excisions or cutouts 26 are concentrically aligned and spaced one from the other at the interior ends of elastomeric sleeve 25. Toward the central section of sleeve 25, the arcuate cutouts 26 stop and a series of rings 27 are formed across the central interior of the sleeve 25. The rings 27 are of a sinusoidal or similar configuration to the exterior of the sealing gasket. The exterior 28 of elastomeric sleeve 25 is of cylindrical configuration and contains beveled ends 29.

A clamp ring 30 surrounds elastomeric sleeve 25 and also has radially inwardly sloping frustoconical surfaces 31 on both sides thereof. Bolts 32 which pass through outstanding flanges 33 provide a constricting means and are located at the arcuate extents of clamp ring 30.

During installation, the sealing gasket 16 is positioned within elastomeric sleeve 25 so that its corrugated exterior surface coincides with the corrugated interior surface of sleeve 25. In this manner the exterior of sealing gasket 16 will be in contact with the sleeve 25 at all exterior surfaces except at the inwardly extending ring 17. Clamp ring 30 is then positioned over the outside of the elastomeric sleeve 25 with bolts 32 in an untightened position. Glass pipes 11 and 12 with their plain ends 14 and 15 are inserted one at a time or simultaneously into the coupling so that ends 14 and 15 stop in engagement against flanges 18 of inwardly extending end 17. As ends 14 and 15 are progressing inwardly toward ring 17, they move easily past ends 21 of sealing gasket 16 because ends 21 are flared in an outward direction and hence do not catch against the ends of the glass pipes. When glass pipes 11 and 12 are seated against ring 17 of gasket 16, clamping ring 30 is constricted by tightening bolts 32. Frustoconical surfaces 31 act against the beveled ends 29 of elastomeric sleeve 25 thus preventing, to any appreciable extent, extrusion or expansion of the sleeve material in an axial direction. The constricting force applied against elastomeric sleeve 25 by clamp ring 30 forces arcuate cutouts 26 radially inward so that they grasp the external surfaces of the glass pipes. In this manner the glass pipe is prevented from being blown out or axially ejected from the pipe coupling because of the internal pressure from within the pipe system acting upon the exposed edges of the glass pipe. An effective seal is achieved between the sealing gasket 16 and the external surface of the glass pipe because the ringed surface of sleeve 25 is forced radially inward thus causing the rings defined by 19 and 20 in the drawing to have a tendency to straighten out and go into compression under the influence of the constricting force as supplied by elastomeric sleeve 25. The undulations on the sealing gasket 16 will not entirely collapse under the radial constricting force of sleeve 25, therefore, the radially innermost surfaces of the sealing gasket undulations will be firmly in contact with the glass surface of the pipes thus preventing the passage of a fluid from within the pipe system and out through the pipe coupling.

Figure 2:
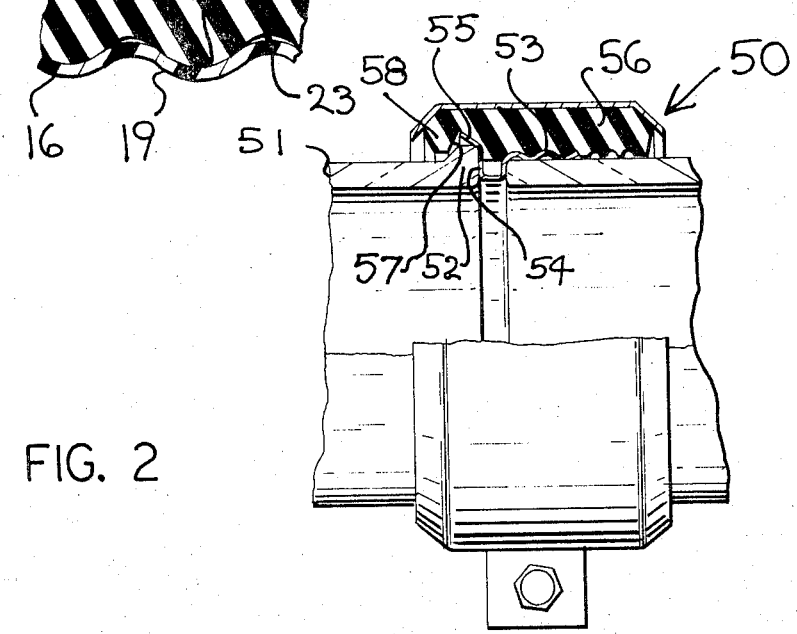
FIG. 2 shows a side view of a pipe coupling partly in section which illustrates a variation in the pipe coupling.

FIG. 2 shows a pipe coupling, partly in section, that is somewhat similar to the coupling depicted in FIG. 1 and heretofore described in detail. FIG. 2, however, shows a coupling adapted to accommodate a glass pipe with a plain end and an axially aligned glass pipe with a flanged end. The overall coupling is represented by numeral 50. That end of coupling 50 which surrounds the glass pipe with the plain end is for all practical purposes identical to one-half of coupling 10, therefore the aforegoing description of its details need not be repeated herein.

Glass pipe 51 contains an outwardly flanged or bulbous end 52 that has a greater radial extent than does the exterior of pipe 51. Sealing gasket 53 which can be made from Teflon or similar material abuts end 52 of glass pipe 51 outwardly extending at flange 54. Flange 54 of gasket 53 is coupled to the small end of a frustoconical extension 55 of gasket 53. As can be seen in FIG. 2, the radially outermost free edge of frustoconical extension 55 terminates radially outward and beyond the outer periphery of flanged end 52. It is to be considered within the scope of the present invention if frustoconical section 55 were to be curved instead of frustoconical as shown in the drawings. Elastomeric sleeve 56 contains an internal groove 57 into which the extending part 55 of gasket 53 registers. The end 58 of sleeve 56 adjacent flanged end 52 of glass pipe 51 forms an inwardly protruding ring of material that is axially aligned behind flange 52 of glass pipe 51.

When a constricting force is applied by the exteriorly placed clamp ring or compression band, the combination of gasket 53 and sleeve 56 will sealingly grasp the plain ended glass pipe as heretofore described. The inward force applied by sleeve 56 will cause the frustoconical extension 55 of gasket 53 to bend or wrap around the exterior of flanged end 52 of glass pipe 51. At the same time end 58 of sleeve 56 will be moved into contacting engagement behind flanged end 52 thus preventing glass pipe 51 from moving axially out of the confinement of the pipe coupling 50 when an internal pressure is applied within the pipe system.

Figure 3:
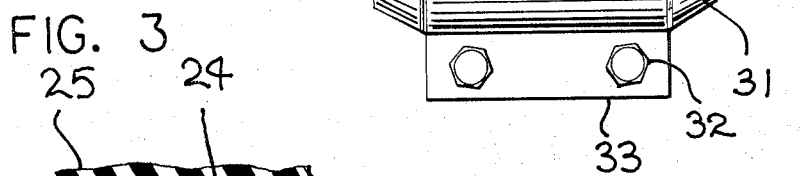
FIG. 3 is an enlarged cross-sectional view through a portion of the sealing gasket and compression sleeve.

FIG. 3 is an enlarged section showing variation in a portion of the sealing gasket 16 and the inner surface of elastomeric sleeve 25 which abuts thereon. A space 23 has been provided radially outward from the peaks or outward sections 20 on gasket 16. In this manner the radially inwardly extending rings 24 of sleeve 25 will apply a concentrated force on portions 19 of gasket 16 thus insuring a more positive seal against the exterior surface of the glass pipe.

The aforegoing description sets forth the details of a simplified glass pipe attachment means that couples ease of installation with a positive leak-proof joint. It is conceivable that the pipe coupling as described within this specification could be used with pipes other than glass.

While certain representative embodiments and details have been shown for the purpose of illustrating the invention, it will be apparent to those skilled in this art that various changes and modifications may be made therein without departing from the spirit or scope of the invention.

I claim:

1. In combination, a pipe coupling including two axially aligned pipes of substantially equal diameter, a deformable sealing gasket with a cross section sinusoidal in part positioned between the abutting ends of said pipes and extending in an axial direction around and partially in contact with a portion of the exterior surface of said pipes adjacent the ends thereof, the ends of said sealing gasket spaced radially outward from the exterior surfaces of said pipes when said coupling is in the assembled but untightened condition, an elastomeric sleeve containing a bore therethrough with radially inwardly protruding sealing rings over a portion thereof placed exteriorly around said sealing gasket and in contact with substantially the entire external surface of said sealing gasket, said elastomeric sleeve continuing axially beyond the ends of said gasket and containing at least one radially inwardly extending ring on each end thereof that will grasp said pipes when said coupling is in the tightened condition, an external clamp ring positioned exteriorly of said elastomeric sleeve and having an axial extent at least as far as said sleeve, said clamp ring equipped with constricting means and containing a radially inwardly extending edge portion that restricts axial growth of said sleeve when said clamp ring is tightened.

2. The combination of a pipe coupling as claimed in claim 1 wherein said elastomeric sleeve contains a plurality of axially spaced circumferentially extending excisions in the surface of said bore, said excisions placed between the ends of said sleeve and the axially terminal point of said gasket.

3. The combination of a pipe coupling as claimed in claim 1 wherein said elastomeric sleeve is in contact with and is of sinusoidal cross-sectional configuration contiguous to the sinusoidal cross section of said sealing gasket.

4. The combination of a pipe coupling as claimed in claim 1 wherein the inwardly protruding rings of the elastomeric sleeve adjacent the exterior portion of said gasket have a radially inward extent greater than the radial extent of the sinusoidal portion of said gasket when in the untightened condition thus providing for a concentration of force in concentric rings around the pipe when the coupling is in the tightened condition.

5. The combination of a pipe coupling as claimed in claim 1 wherein said pipes each have plain pipe ends and wherein the end portions of said sealing gasket are sinusoidal in cross section and wherein said gasket is symmetrically positioned with respect to the ends of said plain pipe ends.

6. The combination of a pipe coupling as claimed in claim 5 wherein the elastomeric sleeve is of symmetrical cross section and extends an equal amount in an axial direction over the sealing gasket and the ends of said pipe.

7. The combination of a pipe coupling as claimed in claim 5 wherein the portion of the sealing gasket that extends between the abutting ends of said pipes has a radially inward extent less than the wall thickness of said pipes.

8. The combination of a pipe coupling as claimed in claim 1 wherein the end of one pipe is plain and the end of the other pipe is flanged and wherein said sealing gasket extends frustoconical in an axial direction over the exterior of said flanged pipe when said coupling is in the untightened condition.

9. The combination of a pipe coupling as claimed in claim 8 wherein the elastomeric sleeve contains a single radially inwardly extending ring positioned axially behind the flange on said other pipe.

10. The combination of a pipe coupling as claimed in claim 9 wherein the single ring abuts the interior of said radially inwardly extending edge portion of said clamp ring.

11. A coupling device for detachably coupling a pipe in intersealed end-to-end assembled relationship with the end of another pipe, said coupling device comprising an elastomeric tubular sealing gasket having an interior wall surface defining an opening extending axially therethrough and providing axially opposite open ends in which respectively to axially receive one each of said pipe ends, said sealing gasket including a pair of axially interspaced sealing rings projecting circumferentially inwardly from said interior wall surface and closely surrounding said pipes and also including an annular pipe-end interspacer axially intermediate said sealing rings and projecting radially into and circumferentially narrowing a medial region of said opening to provide an abutment for abutting against and interspacing said pipe ends, an elastomeric sleeve exteriorly surrounding said sealing gasket and having interior surface confines contacting the peripheral surface of said sealing gasket and continuing axially beyond at least one axial end thereof to define a plurality of annular axially interspaced rings having continuous frictional pipe gripping surfaces, a clamp ring peripherally surrounding said elastomeric sleeve and having means for constricting and radially biasing said elastomeric sleeve against said sealing gasket and in turn biasing said sealing rings on the latter into continuous circumferential sealing contact with each of said pipe ends, said frictional pipe gripping surfaces in response to constriction of said clamp ring being pressed radially inward and providing frictional gripping contact with the peripheral surface of the pipe axially accommodated within said interspaced rings, said frictional gripping surfaces being arranged to increase in frictional gripping intensity in response to frictional movements of the pipe surface thereagainst.